(No Model.)

A. J. SPALDING.
VEHICLE SPRING.

No. 287,063. Patented Oct. 23, 1883.

WITNESSES
F. S. Ourand
Edw. G. Siggers

Albert J. Spalding,
INVENTOR
by C. A. Snow & Co.
Attorneys

UNITED STATES PATENT OFFICE.

ALBERT J. SPALDING, OF ALMA CITY, MINNESOTA.

VEHICLE-SPRING.

SPECIFICATION forming part of Letters Patent No. 287,063, dated October 23, 1883.

Application filed June 30, 1883. (No model.)

*To all whom it may concern:*

Be it known that I, ALBERT J. SPALDING, a citizen of the United States, residing at Alma City, in the county of Waseca and State of Minnesota, have invented a new and useful Vehicle-Spring, of which the following is a specification, reference being had to the accompanying drawings.

This invention relates to springs for vehicles, and the object of the same is to provide means which will equal the weight of the vehicle, and thus all danger of breaking the spring will be avoided.

It consists in certain details of construction and combination of parts, as hereinafter fully set forth, and particularly pointed out in the claims.

Figure 1:
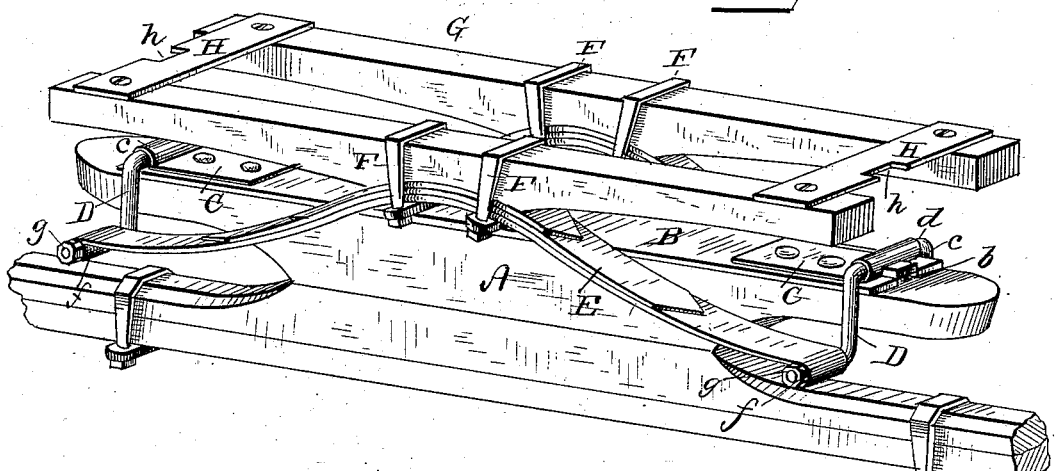
Figure 2:
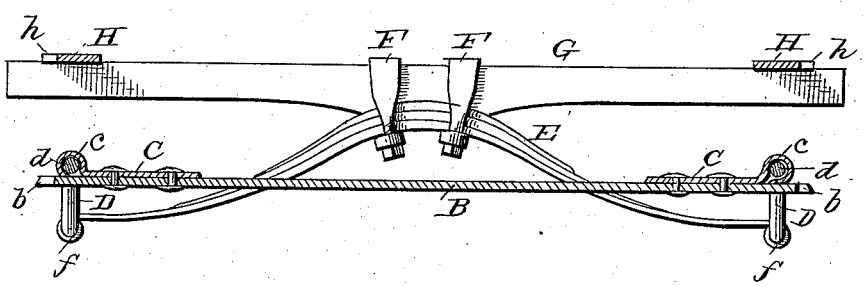
Figure 3:
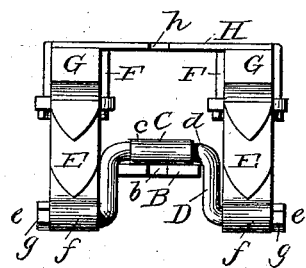

In the accompanying drawings, Figure 1 represents a perspective view of my improved spring applied in position. Fig. 2 represents a longitudinal sectional view of my improved spring detached from the vehicle. Fig. 3 is an end view of the same.

Similar letters indicate corresponding parts in all the figures.

Referring to the drawings, A designates the bolster of a vehicle, having a flat metallic plate, B, secured to the top thereof. As shown, the plate is formed with openings or slots $b$ at each end, to receive headed stakes, pins, or bolts, which secure the plate to the bolster. This fastening is found sufficient to secure the two parts together; but it is obvious that clips or other fastening means may be added to secure the plate more firmly to the bolster. To the upper part of the plate B is secured at each end a supplemental plate, C, having its outer ends forming journals $c$ for a cranked bar or rod, D. The middle portion or crank $d$ of said rod passes through the journals. Then on each side of the middle portion the rod extends downward, its ends being extended outward, as shown at $e$.

E designates springs secured at their middle portions, by clips F F, to a wooden frame, G, which rests on each spring. The ends of the springs are constructed to form journals $f$, in which the rod D is arranged to swing. A screw-cap, $g$, is secured on the ends $e$ of the rod, and prevents the journals $f$ from sliding off the said ends. The under surface of the frames G, where they connect with the springs, are concaved to fit the surface of said springs, while the clips F are either flat or are fitted at their upper portions in recesses of the frames, so that the wagon-box will rest smoothly on the springs.

H designates cross-bars, formed, preferably, of band-iron, and connecting the ends of frames G, said cross-bars having a slot or opening, $h$, formed therein for the attachment of the frames to the wagon-body. Said cross-bars keep the spring in place at the top, so that there is no working and getting out of order.

The operation of my invention can be readily understood from the foregoing description, taken in connection with the annexed drawings. While the vehicle is in motion the action of the same slides the springs slightly, first on one side and then on the other, and this sliding movement will distribute the weight of the wagon equally upon the two springs. Thus the springs are allowed play to work, so that they will not break when a heavy weight comes on them, but will equalize the weight of the vehicle-box upon the bolsters. It will be seen that the weight of the vehicle-box is first transmitted to the center of the springs, which, by means of the sliding movement of the springs upon the rods D, brings a portion of the weight upon the ends of the bolsters, and the weight is equalized and the springs are prevented from being broken. The cranked rod D will always work to the action of the springs, and will not get out of order, while the connected frames G serve to keep the springs in place.

My spring is very simple and durable in its construction and efficient in operation. It can be easily taken off and replaced, and has other advantages too numerous to be recited here.

It is obvious that various modifications may be made of the foregoing construction without departing from the spirit or scope of my invention.

Having thus described my invention, I claim as new—

In a vehicle-spring, the combination, with the bolster, of a plate secured to the top of the same, and having a supplemental plate, C, attached thereto at its outer ends, cranked rods D, working in journals $c$ of the supplemental plate, a pair of springs, E, attached to the ends of the rods, and having screw-caps $g$ fitting over the same, a corresponding number of frames, G, secured to the middle portion of each spring, and cross-bars H, connecting the frames together, substantially as and for the purpose set forth.

In testimony that I claim the foregoing as my own I have hereto affixed my signature in presence of two witnesses.

ALBERT J. SPALDING.

Witnesses:
EDWD. BEULING,
WENDELL PIERCE.